UNITED STATES PATENT OFFICE.

HUGH BURGESS, OF ROYER'S FORD, PENNSYLVANIA.

IMPROVEMENT IN PROCESSES OF DECOMPOSING CRYOLITE.

Specification forming part of Letters Patent No. 167,986, dated September 21, 1875; application filed July 14, 1875.

*To all whom it may concern:*

Be it known that I, HUGH BURGESS, of Royer's Ford, Montgomery county, Pennsylvania, have invented a Process of Decomposing Cryolite, of which the following is a specification:

The object of my invention is to rapidly and economically effect the decomposition of cryolite, and this object I attain in the manner which I will now proceed to describe.

The process consists in subjecting the cryolite while it is at a dull-red heat to the action of steam, superheated steam being preferably employed on account of its more complete and speedy action.

In carrying out the process the cryolite is first finely powdered, and is then placed in a thin layer upon the hearth of a reverberatory furnace, where it receives the required heat, and while in this state the superheated steam is passed over and through the mass. I prefer to superheat the steam by passing it through pipes maintained at from a dull-red to a full-red heat, in order that the steam may not acquire a temperature high enough to fuse the fluoride of sodium, which is formed at an early stage of the process. The mass is stirred thoroughly from time to time in order to insure the proper action of the superheated steam upon all parts of the same, and in due time nearly the whole of the cryolite will be decomposed, hydrofluoric acid and aluminate of soda, and small quantities of fluoride of sodium and fluoride of aluminium, being the resulting products, the former passing out and being condensed with the steam, and the latter, which may be mixed with a small quantity of undecomposed cryolite, and with oxides of the metals contained in the same, such as lead, iron, &c., remaining in the furnace in the form of a white or light-gray mealy powder. This may now be removed from the furnace and transferred directly to the lixiviating-tanks, where the aluminate of soda may be dissolved out, by means of hot water, from the residue, and may be decomposed by the usual means into alumina and carbonate of soda.

The residue may be reground and introduced with a new charge into the furnace—a plan which I prefer, as it insures the thorough decomposition of all the cryolite, and tends to keep the new charge mechanically open and exposed to the action of the steam, a point which is somewhat difficult when the cryolite is very pure. In working a charge through a furnace the cryolite should be introduced at the cooler end, and gradually brought forward to the hotter end of the furnace, but in no case must the heat be sufficient to cause the fusion of any part of the charge, which must be kept as open and pulverulent as possible.

I do not confine myself to any particular form of furnace, nor do I restrict myself to the use of superheated steam, as pure hydrogen might be used if desired; but

I claim as my invention—

The within-described process of decomposing cryolite—that is to say, subjecting it while it is maintained at a dull-red heat to the action of steam, which is forced into and through the mass of heated cryolite, substantially as herein set forth.

In testimony whereof I have signed my name to this specification in the presence of two subscribing witnesses.

HUGH BURGESS.

Witnesses:
EDWARD H. ECKFELDT,
HARRY SMITH.